(12) United States Patent
Janyavula et al.

(10) Patent No.: US 8,850,201 B2
(45) Date of Patent: Sep. 30, 2014

(54) SYSTEM, APPARATUS, AND METHOD FOR DIGITAL DISTRIBUTION

(75) Inventors: Ganesh Janyavula, Santa Clara, CA (US); Renganathan Veerasubramanian, Santa Clara (CA)

(73) Assignee: Kiora, Inc., Santa Clara, CA (US)

( * ) Notice: Subject to any disclaimer, the term of this patent is extended or adjusted under 35 U.S.C. 154(b) by 0 days.

(21) Appl. No.: 13/540,483

(22) Filed: Jul. 2, 2012

(65) Prior Publication Data

US 2013/0007450 A1   Jan. 3, 2013

Related U.S. Application Data

(60) Provisional application No. 61/503,929, filed on Jul. 1, 2011.

(51) Int. Cl.
| | |
|---|---|
| H04L 9/32 | (2006.01) |
| G06F 7/04 | (2006.01) |
| G06F 21/00 | (2013.01) |
| H04L 29/06 | (2006.01) |
| H04N 21/266 | (2011.01) |
| H04N 21/254 | (2011.01) |
| H04N 21/2347 | (2011.01) |

(52) U.S. Cl.
CPC ........... *H04L 63/10* (2013.01); *H04L 2463/101* (2013.01); *H04N 21/26613* (2013.01); *H04N 21/2541* (2013.01); *H04N 21/2347* (2013.01)
USPC ................................ 713/168; 726/26; 705/51

(58) Field of Classification Search
USPC ................................ 713/168; 726/26; 705/51
See application file for complete search history.

(56) References Cited

U.S. PATENT DOCUMENTS

| | | | |
|---|---|---|---|
| 7,869,602 B1 * | 1/2011 | Faros et al. .................... | 380/277 |
| 2003/0105718 A1 * | 6/2003 | Hurtado et al. ................. | 705/51 |
| 2007/0180496 A1 * | 8/2007 | Fransdonk ........................ | 726/3 |
| 2007/0282747 A1 | 12/2007 | Shen et al. | |
| 2008/0059992 A1 * | 3/2008 | Amidon et al. ................. | 725/25 |
| 2011/0225417 A1 * | 9/2011 | Maharajh et al. ............. | 713/150 |

* cited by examiner

*Primary Examiner* — Techane Gergiso
(74) *Attorney, Agent, or Firm* — LeonardPatel PC; Michael A. Leonard, II; Sheetal S. Patel

(57) ABSTRACT

An apparatus for encrypting content to be played on another device is provided. The apparatus includes a processor and memory that includes a set of instructions. The set of instructions is configured to cause the processor to receive a selection of content from a user accessing the apparatus, and determine whether the user is authorized to receive the content. The set of instructions is further configured to cause the processor to transfer content along with an encrypted key associated with the user when the user is authorized to receive the selected content.

19 Claims, 8 Drawing Sheets

SYSTEM, APPARATUS, AND METHOD FOR DIGITAL DISTRIBUTION

CROSS-REFERENCE TO RELATED APPLICATION

This application claims the benefit of U.S. Provisional Patent Application No. 61/503,929, filed on Jul. 1, 2011. The subject matter of the Provisional Patent Application is hereby incorporated by reference in its entirety.

FIELD

The present invention relates to distributing digital media, and more particularly, to distributing digital media in a secure manner.

BACKGROUND

Consumers in today's market often rent or purchase movies at various kiosks. However, security issues may arise when purchasing or renting movies at kiosks. For example, a person may rent a movie and then illegally copy the movie for distribution without paying the owner. This may cause the retail owner of the movie to be owed money due to the illegal sale of the copied movie. Thus, it may be beneficial for a system with content encrypted in such a manner that the content plays movies on an authorized unit, but non-authorized units will not play rented or purchased movies.

SUMMARY

Certain embodiments of the present invention may provide solutions to the problems and needs in the art that have not yet been fully identified, appreciated, or solved by current content distribution systems. For example, some embodiments may encrypt the content downloaded by the user such that the content can play on units authorized by the service provider.

In one embodiment, an apparatus includes a processor and memory that includes a set of instructions. The set of instructions is configured to cause the processor to receive a selection of content from a user accessing the apparatus, and determine whether the user is authorized to receive the selected content. The set of instructions is further configured to cause the processor to transfer the selected content along with an encrypted key associated with the user when the user is authorized to receive the content.

In another embodiment, a computer-implemented method for activating a content viewing unit is provided. The method includes accessing, by a computing device, a portal of a distribution service unit and registering, by the computing device, a content viewing unit to view encrypted content downloaded from a distribution unit. The method further includes activating, by the computing device, the content viewing unit when registration of the content viewing unit is completed.

In yet another embodiment, a system includes a content distribution server configured to receive data from a content producer, and transmit data to at least one content distribution unit. The content distribution server is further configured to transmit encryption keys together with the content to the at least one content distribution unit.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

In some embodiments, a distribution unit may include preloaded content. A user may access the preloaded content on the distribution unit and select the preloaded content for rental purposes. For example, the user may submit a user name and password or provide a membership number at the distribution unit. Upon authentication, the content is encrypted and stored in a portable unit, such as a universal serial bus ("USB") storage device. The portable unit may be connected to another unit provided by the content distribution service or any authorized unit, depending on the implementation. Authorized units may include, but are not limited to, a Roku® device, a Western Digital Live® device, or any other suitable device. The user may then select the content on the display connected to, or otherwise in communication with, the authorized unit and view the content.

In some embodiments, when a user rents from a kiosk or other suitable content delivery station, an authorized unit, such as a set top box, displays a "fingerprint" at random locations on the screen. The fingerprint is a combination of the identifier ("ID") of the kiosk and the ID of the user who rented the movie or other content. The combination creates a key that can uniquely identify the user. This serves as a fingerprint to track users who pirate the content, or otherwise use the content illegally.

When a user rents the content, the license for the content may be copied to a USB stick, which also carries a kiosk ID. The set top box may carry a user ID, and software makes a combination of these IDs to create a new fingerprint. This combination of kiosk ID and user ID provides an innovative security solution.

In some embodiments, a user may access a web portal and select the content that the user desires to view. The selected content may then be placed in a queue according to the user's preference. When the user accesses the distribution unit, the distribution unit will provide the user with the queue containing the selected content. This may allow the user to easily select the content that the user desires to view.

In certain embodiments, a content provider may provide content to a distribution server that the content provider would like to monetize. In such a case, the server encrypts the content with digital technology rights and the encrypted content is distributed to each distribution unit for users to access upon payment. It should also be appreciated that such content may also be accessible via a web portal. This allows the content provider to be compensated based on an agreed price with the content distribution service when a user rents or purchases the content for viewing.

Figure 1:
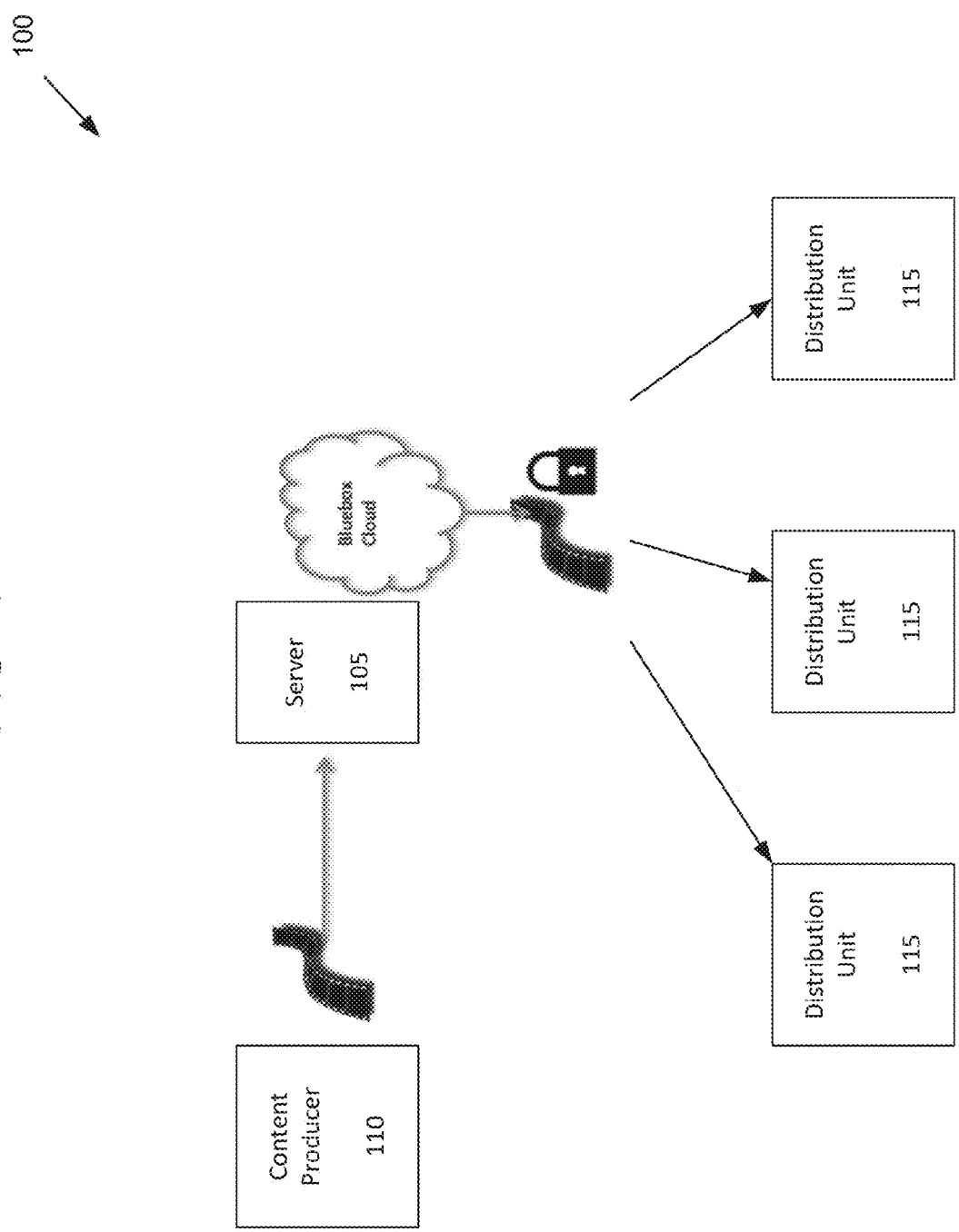
FIG. 1 illustrates a media distribution system, according to an embodiment of the present invention.

FIG. 1 illustrates a media distribution system 100, according to an embodiment of the present invention. In this embodiment, a content producer 110 may provide content to a media distribution server (hereinafter "server") 105. Content producer 110 may include a distributor of content, an owner of content rights, or any person or entity that would be appreciated by a person of ordinary skill in the art.

Content may include media, such as audio, video, etc. In addition to providing the content, content producer 110 may provide usage rights for the content. Usage rights may include a geolocation of the content, demographic usage of the content, pricing information of the content, rental properties of the content, purchase transaction properties of the content, and/or any information that would be appreciated by a person of ordinary skill in the art. It should also be appreciated that the content may be encoded and encrypted with a key.

Server 105 may distributed the enclosed and encrypted content to a plurality of distribution units 115. Distribution units 115 may include kiosks or any units that can distribute the content to the end user. It should be appreciated that in some embodiments, the content can be encrypted with different keys, such that each distribution unit 115 contains content encrypted with different keys. Stated differently, content that is stored in one distribution unit 115 may have a different key than the key for the same content stored in another distribution unit 115.

In another embodiment, content stored in a distribution unit 115 may include a plurality of encrypted keys. Because content may include a plurality of encrypted keys, a user of the content may be assigned with one encrypted key selected from the plurality of encrypted keys such that no two users have the same encrypted key. Stated differently, because multiple users may access content at the same distribution unit, each user may be assigned a unique encrypted key associated with the content.

Distribution unit 115 may also include a database (not shown) that stores intelligence data. Intelligence data may include information relating to the content, including the encrypted key stored on each distribution unit and the location of the content with respect to the distribution unit.

Figure 2:
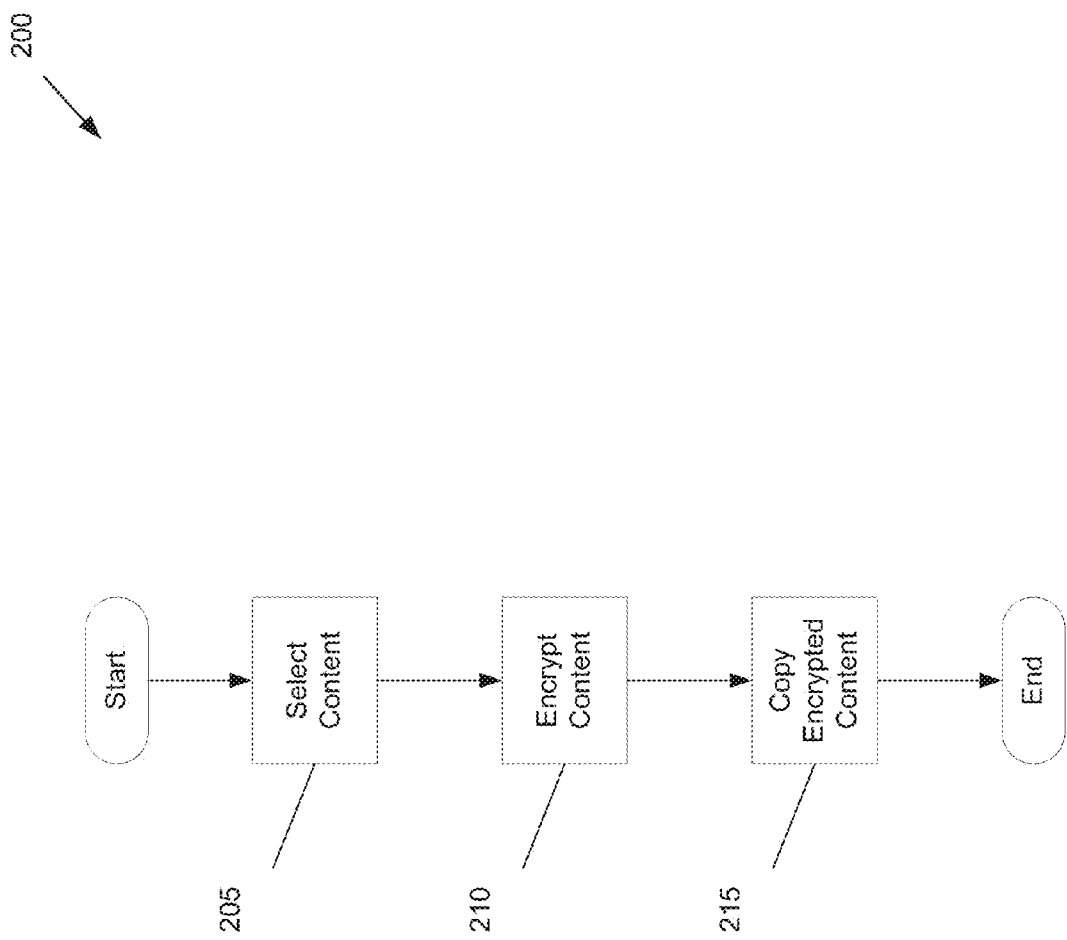
FIG. 2 illustrates a flow diagram of a process for viewing content, according to an embodiment of the present invention.

FIG. 2 illustrates a flow diagram of a process 200 for downloading the content, according to an embodiment of the present invention. The process may be executed by the computing system such as that shown in FIG. 7 in some embodiments. The process begins at 205 with a user selecting the content at a distribution unit.

Because content may include a plurality of encryption keys associated with the content, the content may be encrypted with a personalized encryption key for the user at 210. The content may then be copied to another data storage unit at 215. The data storage unit may include a USB storage device or any portable storage unit that can store content. In another embodiment, content may be directly copied to another portable storage unit using a communication unit that allows transfer of data from the distribution unit to the portable storage unit. Once copied, the user may view the content on any unit that is certified by the distribution service or server.

Figure 3:
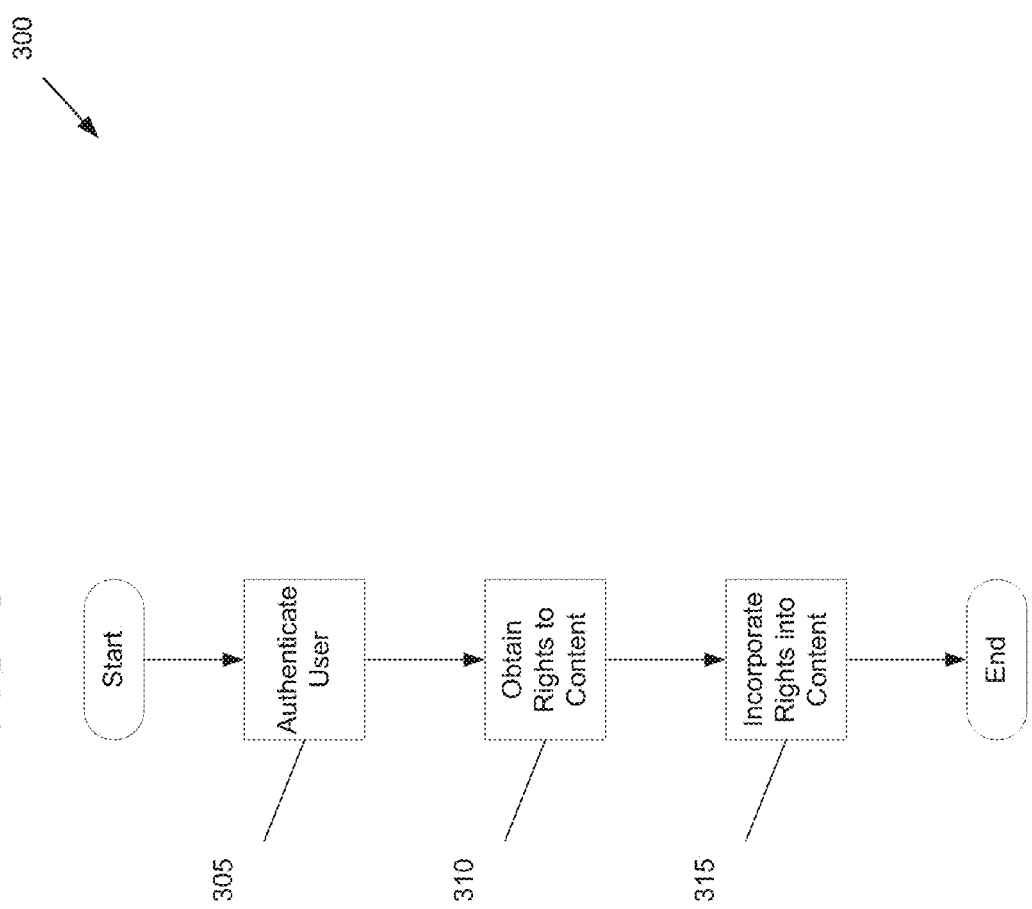
FIG. 3 illustrates a flow diagram of a process for delivering usage rights to a user, according to an embodiment of the present invention.

FIG. 3 illustrates a flow diagram of a process 300 for delivering usage rights to a user, according to an embodiment of the present invention. The process of FIG. 3 may be executed by media distribution server 105 shown in FIG. 1 in some embodiments. It should be appreciated that media distribution server 105 shown in FIG. 1 provides the content usage rights for authenticated users of the system.

At 305, a distribution unit may authenticate a user when, for example, the user selects content. After successful authentication, the distribution unit may obtain the rights that are specific to the content and the user from the server at 310. The rights may then be incorporated into the encrypted content and delivered to the user at 315.

It should be appreciated that each user may be provided with a content viewing unit. The content viewing unit may be activated as part of the distribution system service. Unless the content viewing unit is registered and activated, the content cannot be distributed from the distribution unit or cannot be played on the content viewing unit in some embodiments.

Figure 4:
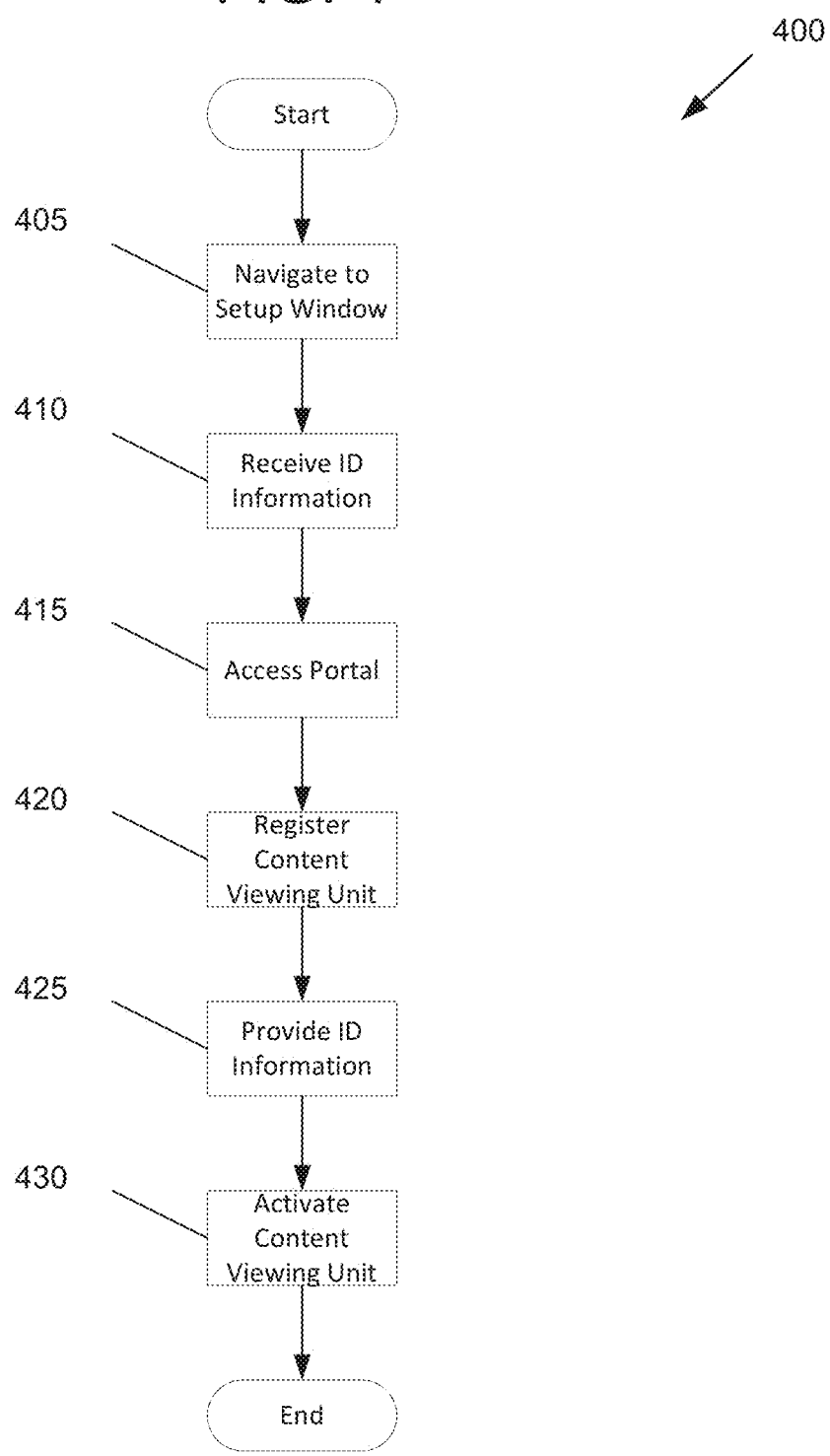
FIG. 4 illustrates a flow diagram of a process to activate a content viewing unit, according to an embodiment of the present invention.

FIG. 4 illustrates a flow diagram of a process 400 to activate a content viewing unit, according to an embodiment of the present invention. The process may be executed by a computing system such as that shown in FIG. 7 in some embodiments. Process 400 begins with the user navigating to a setup window when the content viewing unit is powered on at 405. At 410, the user receives identification ("ID") information of the content viewing unit from the setup window. ID information may include an alphanumeric code, a numeric digital code, or a combination thereof. In certain embodiments, ID information may include a serial number located on the shipping box or the content viewing unit itself.

At 415, the user logs on to, or accesses, a web portal of the distribution unit site. At 420, the user selects to register a content viewing unit and at 425 the user provides the ID information of the content viewing unit to register the content viewing unit. After successful registration, the content viewing unit is activated at 430 for offline use. It should be appreciated that each distribution unit may recognize the content viewing unit and the user of the content viewing unit when the content viewing unit is successfully registered. This may allow the content viewing unit to playback content for all content that is received from the distribution unit.

The method steps shown in FIGS. 2-4 may be performed, in part, by a computer program, encoding instructions for a nonlinear adaptive processor to cause at least the methods described in FIGS. 2-4 to be performed by the various apparatuses discussed herein and their equivalents. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2-4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 5:
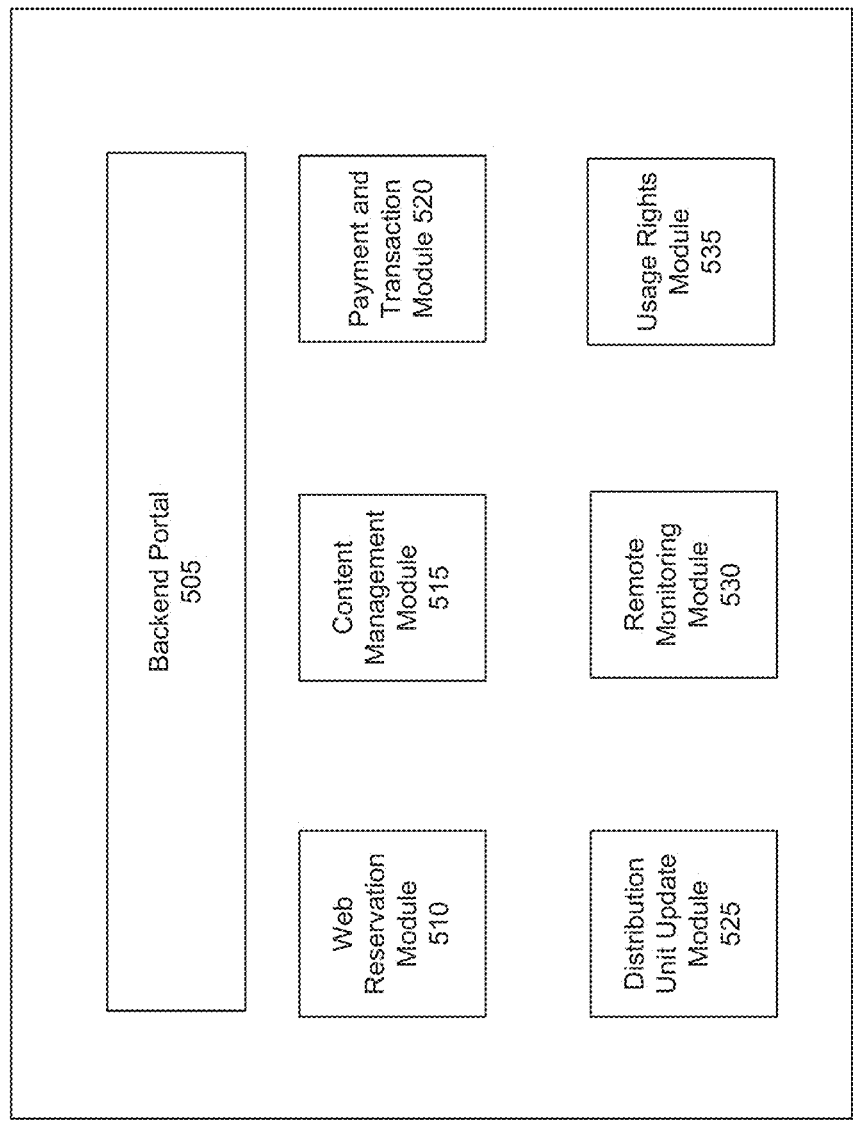
FIG. 5 illustrates a block diagram of a content distribution system, according to an embodiment of the present invention

FIG. 5 illustrates a content distribution system 500, according to an embodiment of the present invention. Content distribution system 500 may include a processor (not shown)

configured to execute the features of backend portal 505, web reservation module 510, content management module 515, payment and transaction module 520, distribution update module 525, remote monitoring module 530, and usage rights module 535.

In this embodiment, backend portal 505 allows a new user to register and subsequently authenticate the user as part of a single sign-on to the system. Backend portal 505 may allow user registration and password retrieval, and provide a history of user transactions including purchases and/or rentals.

Web reservation module 510 is configured to allow a registered user to reserve content on a web portal. Once the content is reserved, the user may download the content from the distribution unit. This may reduce the time a user spends browsing for content. Content management module 515 may allow content browsing based on genres, as well as content ingestion with metadata. Content management module 515 may also set pricing for purchases or rentals for particular content.

Payment and transaction module 520 that allows a user to purchase or rent content, as well as set a purchasing or rental limit for the year, month, etc. Payment and transaction module 520 may also interface with other services, such as PayPal®, to allow processing of payments. Payment and transaction module 520 may also maintain a transaction history of the purchase, and transmit a confirmation message via text, email, etc., after each purchase or rental, or when limits are reached.

Per the above, content distribution system 500 also includes distribution unit update module 525 and remote monitoring module 530. Distribution unit update module 525 may update the content stored on each distribution unit, as well as perform other updates, such as updates to the firmware within each distribution unit. Remote monitoring module 530 may continue to monitor the status of the distribution units, and immediately correct any functionality issues on the distribution units.

It should also be appreciated that usage rights module 535 is also utilized for content that is being requested by a user. For example, a license for the content is transmitted from content distribution system 500 to the distribution unit when an authorized user purchases or rents content.

Figure 6:
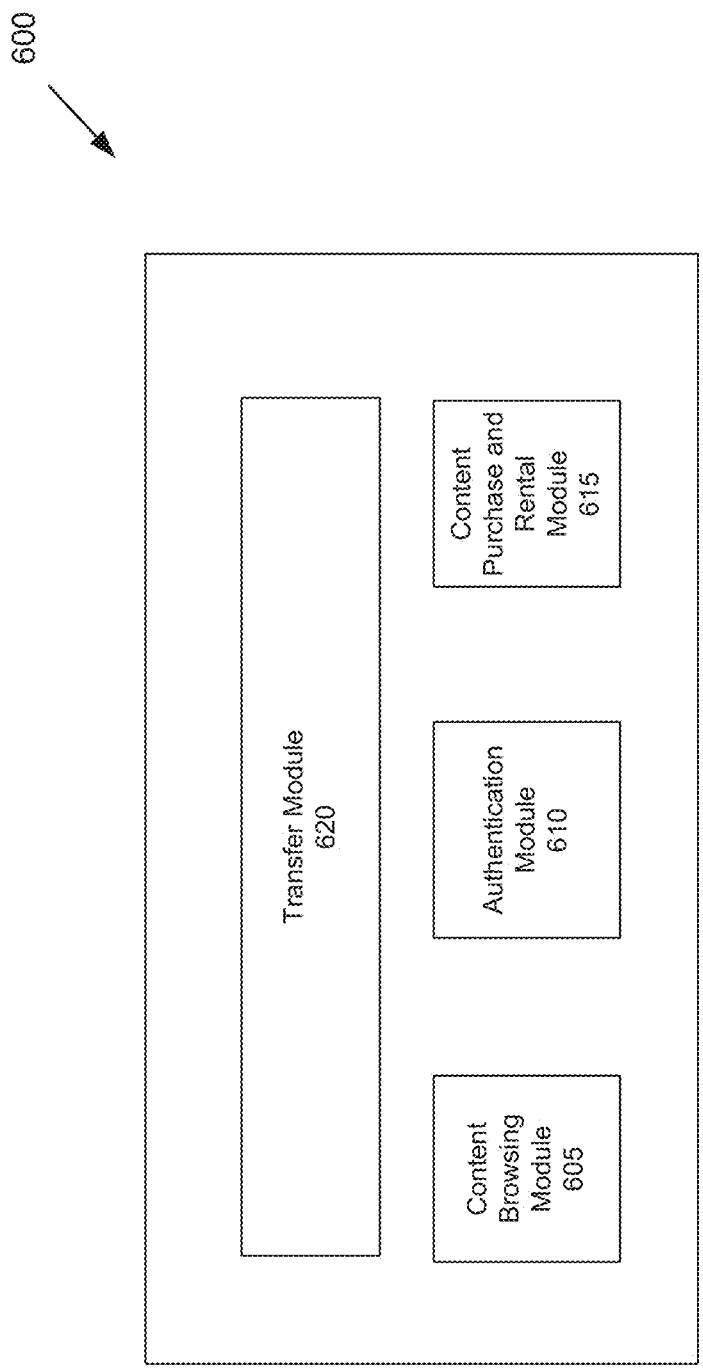
FIG. 6 illustrates a block diagram of a distribution unit, according to an embodiment of the present invention.

FIG. 6 illustrates a block diagram of a distribution unit 600, according to an embodiment of the present invention. In this embodiment, distribution unit 600 provides a content browsing module 605 configured to allow a user to browse for content. An authentication module 610 may be used to allow the user to login and authenticate at distribution unit 600 after selection of the content has been made. Authentication can be performed after the user has entered or provided a username and password to distribution unit 600.

Content purchase and rental module 615 may allow the user to select the content and to rent or purchase the content. Based on the rental or purchase selection of the content, a subsystem (not shown) of distribution unit 600 may communicate with the backend of the server to check if the user has a sufficient balance in his or her account. If the user does not have sufficient funds, the user may be denied access to purchase or rent the content or may be allowed a predetermined number of grace rentals.

Transfer module 620 may transfer the selected content to the content viewing unit. However, prior to transferring, transfer module 620 determines whether the content viewing unit has sufficient storage space to store the content. It should be appreciated that error checks for transfer may be performed before and after the transfer has been completed.

Figure 7:
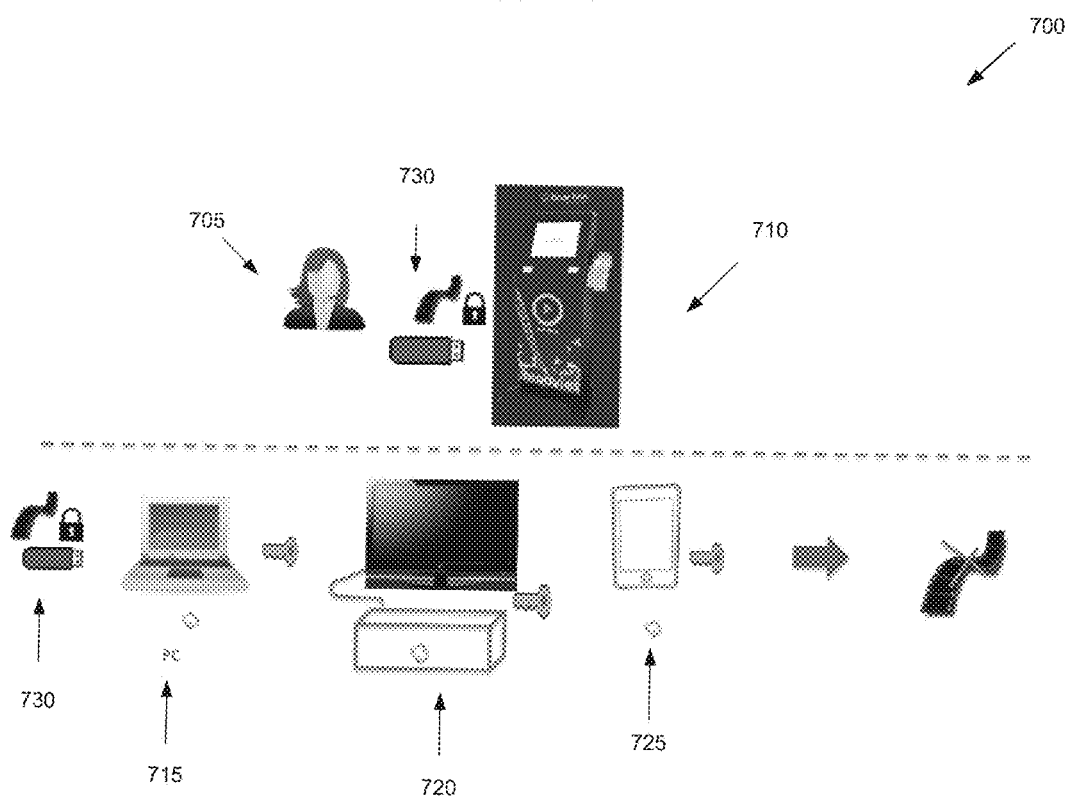
FIG. 7 illustrates a block diagram of a system for downloading and viewing content, according to an embodiment of the present invention.

FIG. 7 illustrates a block diagram of a system 700 for downloading and viewing content, according to an embodiment of the present invention. In this embodiment, a user 705 may access a distribution unit 710, such as a kiosk, and select content. The selected content may be downloaded on a storage unit 730, such as a USB drive, when user 705 is authenticated.

The downloaded content can be viewed on content viewing units. For example, storage unit 730 may be connected to, for example, a personal computer ("PC") 715, a Roku® device 720, a personal digital assistant ("PDA") 730, etc. However, in order to view the content, the content viewing unit should be authorized by the service provider (e.g., the owner of distribution unit 710). If the content viewing unit is not authorized, then the content cannot be viewed on the unauthorized unit. Such a system may prevent users from copying content without obtaining distribution rights for the content.

Figure 8:
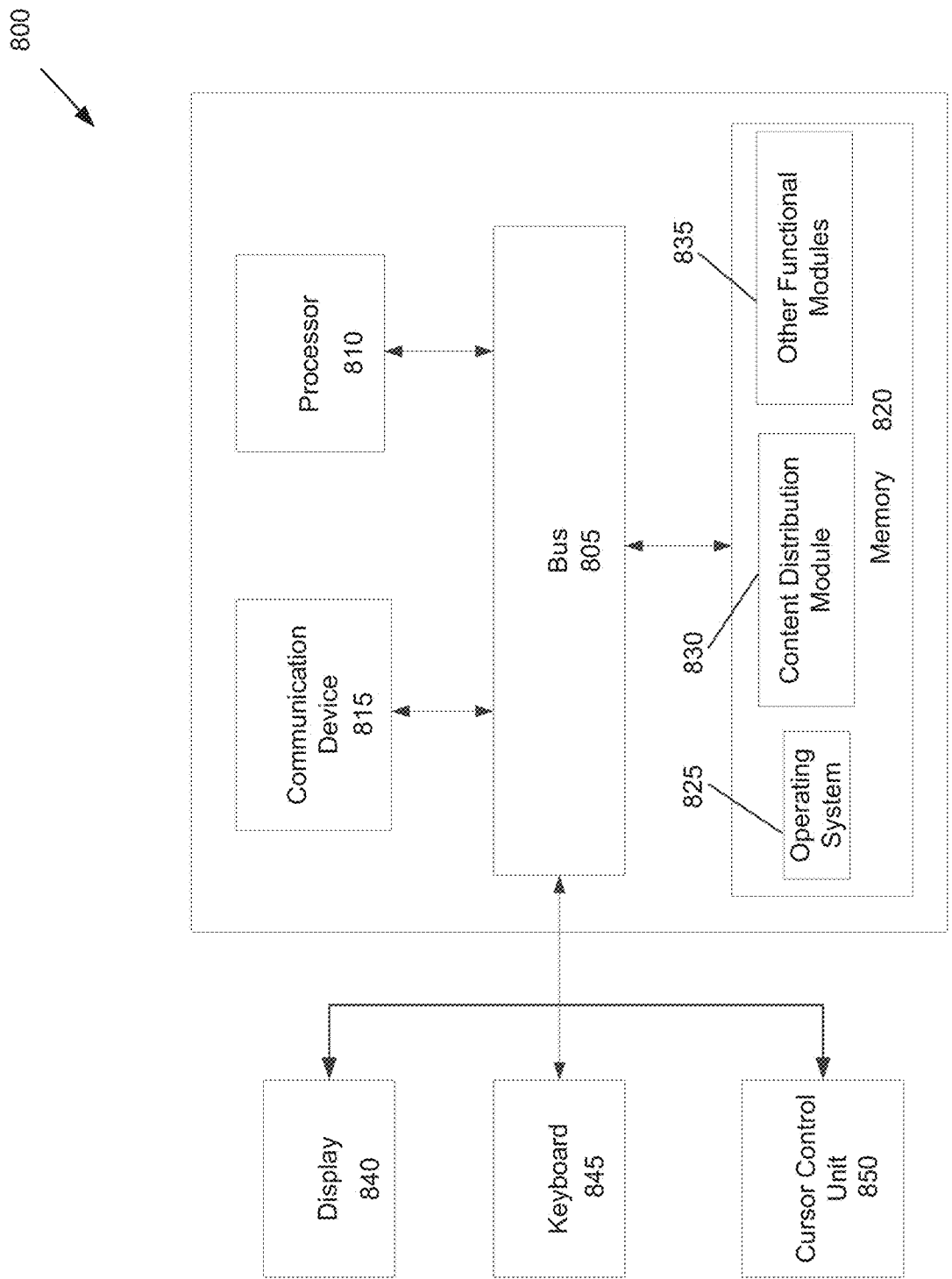
FIG. 8 illustrates a block diagram of a system, according to an embodiment of the present invention.

FIG. 8 illustrates a block diagram of a computing system 800, according to an embodiment of the present invention. System 800 may include a bus 805 or other communication mechanism that can communicate information and a processor 810, coupled to bus 805, that can process information. Processor 810 can be any type of general or specific purpose processor. System 800 may also include memory 820 that can store information and instructions to be executed by processor 810. Memory 820 can be comprised of any combination of random access memory ("RAM"), read only memory ("ROM"), static storage such as a magnetic or optical disk, or any other type of computer-readable medium. System 800 may also include a communication device 815, such as a network interface card, that may provide access to a network.

The computer-readable medium may be any available media that can be accessed by processor 810. The computer-readable medium may include both volatile and nonvolatile media, removable and non-removable media, and communication media. The communication media may include computer readable instructions, data structures, program modules, or other data and may include any information delivery media.

Processor 810 can also be coupled via bus 805 to a display 840, such as a Liquid Crystal Display ("LCD"). Display 840 may display information to the user, such as content that can be purchased or rented. A keyboard 845 and a cursor control unit 850, such as a computer mouse, may also be coupled to bus 805 to enable the user to interface with system 800.

According to one embodiment, memory 820 may store software modules that may provide functionality when executed by processor 810. The modules can include an operating system 825 and a content distribution module 830, as well as other functional modules 835. Operating system 825 may provide operating system functionality for system 800. Because system 800 may be part of a larger system, system 800 may include one or more additional functional modules 835 to include the additional functionality. For example, a distribution unit, such as that shown in FIG. 6, may include additional modules, such as transfer module, a content browsing module, an authentication module, a content purchase and rental module, and any other module that would be appreciated by a person of ordinary skill in the art.

One skilled in the art will appreciate that a "system" could be embodied as a personal computer, a server, a console, a PDA, a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One or more embodiment of the present invention pertains to a retail distribution service configured to vend encrypted and protected content from a distribution unit. Content may be packaged to be unique for each user. The user who purchased or rented the content can view the content on an authorized content viewing unit.

Furthermore, the distribution unit may communicate to the server to verify the identity of the user and request rights to create a unique license for the user prior to distributing the content to the user. The created license may be combined or stored with the content.

In some embodiments, each user is provided with an authorized content viewing unit. The content viewing unit includes credentials or authorization information unique for the user. For example, when the distribution unit provides the content to the user, the content may only be viewed on the authorized content viewing unit. Other devices that are not authorized may not be able to view the content. Thus, such embodiments may prevent illegal copies of the content from being created. It should also be appreciated that a content viewing unit that is compromised may not be able to access the content.

In certain embodiments, the distribution unit includes intelligence modules configured to store encrypted content, and customize the encrypted content based on user preferences. For example, the content may be customized such that the user may have limited playback of the content. The distribution unit may also have the ability to check whether the digital content stored in the distribution unit is valid. If the content is not valid, then the distribution unit may remove, or obtain authorization for, the content.

A content producer may be configured to provide content to the retail distribution service, and provide rules, such as usage rules, to dictate which distribution units can store the content. In some embodiments, the content of the retail distribution service may be transferred to each distribution unit along with usage rights. The usage rights for the content may include, but are not limited to, the rental period, demographics to which content can be vended, one or more geographic locations at which content can be vended at different prices, transaction/purchase/rental prices for the content based on the user accessing the content, etc. It should be appreciated that content that is distributed may expire and cannot be viewed based on the usage rights. For example, if the rental period expires or the geographic location of the user changes, the content may not be viewable in such cases.

It should be noted that the content viewing unit may detect geographic location information using a geographic position unit. The location information may determine whether content can be viewed in a certain geographic location. For example, content may be denied viewing privileges because a newly released content may not be located in a certain geographic location.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a processor; and
memory comprising a set of instructions, wherein
the set of instructions is configured to cause the processor to:
receive a selection of encrypted content from a user accessing the apparatus,
determine whether the user is authorized to receive the selected encrypted content, transfer the selected encrypted content along with an encrypted key associated with the user when the user is authorized to receive the selected encrypted content, combine a kiosk identifier and a user identifier to create a fingerprint; and display the fingerprint at random places on a screen.

2. The apparatus of claim 1, wherein the set of instructions is further configured to cause the processor to obtain rights to the content from a server upon authentication of the user.

3. The apparatus of claim 2, wherein the set of instructions is further configured to cause the processor to incorporate the obtained rights into the content.

4. The apparatus of claim 2, wherein the obtained rights comprise an encrypted key, information related to the authorized user, information of at least one authorized content viewing unit, a geographic location of the at least one authorized content viewing unit, and a usage period of the content.

5. The apparatus of claim 1, wherein the set of instructions is further configured to cause the processor to determine whether content stored within the apparatus is valid.

6. The apparatus of claim 5, wherein the set of instructions is further configured to cause the processor to obtain distribution rights for the content when the stored content is invalid.

7. The apparatus of claim 1, wherein the set of instructions is further configured to cause the processor to periodically check for updates to firmware of the apparatus.

8. The apparatus of claim 7, wherein the set of instructions is further configured to cause the processor to download the updates when updates to the firmware of the apparatus are available.

9. A computer-implemented method, comprising:

accessing, by a computing device, a portal of a distribution service unit;

registering, by the computing device, a content viewing unit to view encrypted content downloaded from a distribution unit;

activating, by the computing device, the content viewing unit when registration of the content viewing unit is completed; and displaying, by the computing device, a fingerprint comprising a combination of a kiosk identifier and a user identifier at random places on a screen.

10. The computer-implemented method of claim 9, further comprising:

transmitting, by the computing device, identification information related to the content viewing unit when registering the content viewing unit.

11. The computer-implemented method of claim 10, wherein the identification information comprises a serial number of the content viewing unit, an alphanumeric code, a numeric digital code, or a combination of the alphanumeric code and the numeric digital code.

12. The computer-implemented method of claim 9, further comprising:

transmitting, by the computing device, a geographical location of the content viewing unit when registering the content viewing unit.

13. The computer-implemented method of claim 9, further comprising:

transmitting, by the computing device, information related to the user accessing the content viewing unit when registering the content viewing unit.

14. A system, comprising:

a content distribution server embodied on a physical computing system, the content distribution server configured to cause the physical computing system to:

receive content from a content producer, transmit content to at least one content distribution unit, and transmit encryption keys together with the content to the at least one content distribution unit; and a computing device configured to:

combine a kiosk identifier and a user identifier to create a fingerprint; and display the fingerprint at random places on a screen.

15. The system of claim 14, wherein the content producer is configured to instruct the content distribution server to selectively transmit the content to predetermined content distribution units.

16. The system of claim 14, wherein the content distribution unit is configured to transfer the content, and an encrypted key associated with the content, to a portable device of a user.

17. The system of claim 16, wherein the encrypted key is customized for the user and a content viewing unit.

18. The system of claim 16, wherein the least one content viewing unit is configured to load content and an encrypted key associated with the content, and display the content when the encrypted key comprises identification information matching the identification information of the content viewing unit.

19. The system of claim 16, wherein the content is restricted from access after a predetermined period of time or based on the usage rights associated with the user.

\* \* \* \* \*